(12) United States Patent
Yamanouchi et al.

(10) Patent No.: US 12,103,388 B2
(45) Date of Patent: Oct. 1, 2024

(54) ON-VEHICLE INTERFACE APPARATUS (71) Applicant: Toyota Jidosha Kabushiki Kaisha, Toyota (JP)

(72) Inventors: Yuchi Yamanouchi, Toyota (JP); Hideto Tanaka, Kariya (JP); Masaharu Kinoshita, Kariya (JP); Daisuke Naitou, Kariya (JP); Kei Kawasaki, Kariya (JP); Takuto Munekata, Kariya (JP); Takao Shinohara, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 17/391,634

(22) Filed: Aug. 2, 2021

(65) Prior Publication Data

US 2022/0041056 A1    Feb. 10, 2022

(30) Foreign Application Priority Data

Aug. 4, 2020   (JP) .................................. 2020-132172

(51) Int. Cl.
*B60K 35/00* (2024.01)
*B60K 35/10* (2024.01)
*B60K 35/28* (2024.01)
*B60K 35/29* (2024.01)

(52) U.S. Cl.
CPC .............. *B60K 35/00* (2013.01); *B60K 35/10* (2024.01); *B60K 35/28* (2024.01); *B60K 35/29* (2024.01); *B60K 2360/1438* (2024.01); *B60K 2360/178* (2024.01); *B60K 2360/186* (2024.01); *B60K 2360/197* (2024.01)

(58) Field of Classification Search
None
See application file for complete search history.

(56) References Cited

U.S. PATENT DOCUMENTS

| | | | | |
|---|---|---|---|---|
| 2017/0197637 | A1* | 7/2017 | Yamada | G05D 1/0088 |
| 2017/0336920 | A1* | 11/2017 | Chan | G06F 3/0481 |
| 2018/0014182 | A1* | 1/2018 | Jaegal | H04L 67/12 |
| 2018/0272965 | A1* | 9/2018 | Chen | B60R 16/023 |
| 2018/0284774 | A1 | 10/2018 | Kawamoto | |

(Continued)

FOREIGN PATENT DOCUMENTS

| | | |
|---|---|---|
| CN | 109404711 A | 3/2019 |
| CN | 110719865 A | 1/2020 |

(Continued)

*Primary Examiner* — Jaime Figueroa
*Assistant Examiner* — Jerrod Irvin Davis
(74) *Attorney, Agent, or Firm* — Dinsmore & Shohl LLP (57) ABSTRACT

An on-vehicle interface apparatus includes a touch screen and an I/F controller. The I/F controller stores a first message and a second message having a lower urgency level in association with respective events. The I/F controller displays operation switches including operation switches regarding traveling of a vehicle irrespectively of the events on the touch screen, and, in response to occurrence of an event, displays a corresponding message on the touch screen. The I/F controller, in response to detection of a touch operation on a display region of the first message during display of the first message, outputs to the vehicle controller a signal that instructs execution of the driving control corresponding to the first message.

9 Claims, 8 Drawing Sheets

(56) References Cited

U.S. PATENT DOCUMENTS

| | | | |
|---|---|---|---|
| 2018/0334175 A1* | 11/2018 | Boule | B60W 40/08 |
| 2020/0067786 A1* | 2/2020 | Ricci | G06Q 50/26 |
| 2020/0101977 A1 | 4/2020 | Nakai et al. | |
| 2020/0406752 A1* | 12/2020 | Ahn | G06F 3/0304 |

FOREIGN PATENT DOCUMENTS

| | | |
|---|---|---|
| JP | 2005-222231 A | 8/2005 |
| JP | 2015-113038 A | 6/2015 |
| JP | 2019-034370 A | 3/2019 |
| JP | 2019-046165 A | 3/2019 |
| WO | 2017/057059 A1 | 4/2017 |
| WO | 2018/230527 A1 | 12/2018 |

\* cited by examiner

FIG. 8

ON-VEHICLE INTERFACE APPARATUS

CROSS REFERENCE TO RELATED APPLICATION

This application claims priority to Japanese Patent Application No. 2020-132172 filed on Aug. 4, 2020, which is incorporated herein by reference in its entirety including the specification, claims, drawings, and abstract.

TECHNICAL FIELD

The present disclosure relates to an on-vehicle interface apparatus that receives from an operator instructions concerning driving control for a vehicle.

BACKGROUND

On-vehicle interface apparatuses are known in recent years. An on-vehicle interface apparatus includes a touch screen, which is touched to receive various operation instructions for a vehicle. Patent Document 1, for example, discloses an on-vehicle terminal mounted on a commercial vehicle capable of communication with a terminal center. This on-vehicle terminal includes a touch screen that is operated to receive messages from the terminal center or to transmit a state of the vehicle to the terminal center.

Recent progress in automated driving of vehicles has produced vehicles without mechanical operation input units such as a steering wheel or an acceleration pedal. These automated vehicles receive instructions concerning vehicle driving control via a touch screen disposed on an on-vehicle interface apparatus. More specifically, the touch screen of these vehicles displays various operation switches including operation switches for traveling of the vehicle and operation switches for lighting, for example, and an operator operates these switches to perform driving operation of the vehicle.

CITATION LIST

Patent Literature

[Patent Document 1] JP 2005-222231 A

SUMMARY

The touch screen further displays messages from the vehicle along with the operation switches described above. The message appears only when a specific event occurs, and the urgency of the message and whether or not the operator's response is required depends on the type of message. A message reading "shift to automated driving mode: OK", for example, only notifies a current state of the vehicle, and the operator's response is not required. A message such as "emergency stop is required: press emergency stop switch", for example, is an urgent message and the operator's immediate response is required.

The touch screen displays these messages and various operation switches simultaneously. This configuration complicates screen display, leading to a possibility of the operator's missing a message, which is a serious problem if the message is an urgent message. Also, the conventional touch screen size does not allow display on the same screen of an urgent message and a switch used to respond to the urgent message. The operator therefore needs to first confirm the urgent message on one window and then change the window before responding to the urgent message. While this problem may be resolved by increasing the size of the touch screen to allow display in the same window of the urgent message and the switch for responding to the message, the size of the touch screen is fixed according to the design requirement and may not be increased as desired.

Embodiments of the disclosure are therefore directed toward an on-vehicle interface apparatus including a touch screen having a reduced size and enabling the operator to immediately respond to an urgent message.

In accordance with an aspect of the disclosure, an on-vehicle interface apparatus includes a touch screen configured to display an image and detect touch to a screen by an operator, and an I/F controller configured to control display of the touch screen and output to a vehicle controller a signal corresponding to the touch by the operator, and storing a first message with a first urgency level and corresponding to predetermined driving control, and a second message with a second urgency level lower than the first urgency level and not corresponding to driving control, in association with respective events. The I/F controller is further configured to display a plurality of operation switches including operation switches regarding traveling of a vehicle irrespective of the events on the touch screen, and, in response to occurrence of any of the events, display a corresponding message on the touch screen, and in response to detection of a touch operation on a display region of the first message during display of the first message, to output to the vehicle controller a signal that instructs execution of the driving control corresponding to the first message.

Managing the messages according to the urgency and allowing the first message itself to function as a switch enables the operator to immediately respond to the first message that is an urgent message, and also reduces the size of the touch screen.

In the above configuration, the I/F controller may cover all of the plurality of operation switches during display of the first message and render inoperable touch to the plurality of operation switches.

This configuration makes the first message more noticeable to thereby efficiently prevent the operator from missing the first message. Rendering other operation switches inoperable further prevents an erroneous touch of wrong operation switches.

The I/F controller may further output a signal that instructs to the vehicle controller execution of the driving control corresponding to the first message in response to absence of detection of touch to the display region of the first message until elapse of a predetermined timeout period from start of display of the first message.

This configuration allows execution of necessary driving control should the operator miss the first message.

The I/F controller may further display the second message at a location and in a size that do not cover the operation switches regarding traveling of the vehicle and an operation switch regarding lighting.

This configuration allows the operator to operate the operation switch regarding traveling of the vehicle and the operation switch regarding lighting during display of the second message that is a non-urgent message, thereby increasing safety of the vehicle.

The I/F controller may further display the first message further frontward with respect to the second message in a superposed manner to display the first message during display of the second message.

This configuration makes the first message more noticeable to thereby efficiently prevent the operator from missing the first message.

The on-vehicle interface apparatus according the embodiments includes a touch screen having a reduced size and allows the operator to immediately respond to an urgent message.

BRIEF DESCRIPTION OF DRAWINGS

Embodiments of the present disclosure will be described based on the following figures, wherein.

DESCRIPTION OF EMBODIMENTS

Figure 1:
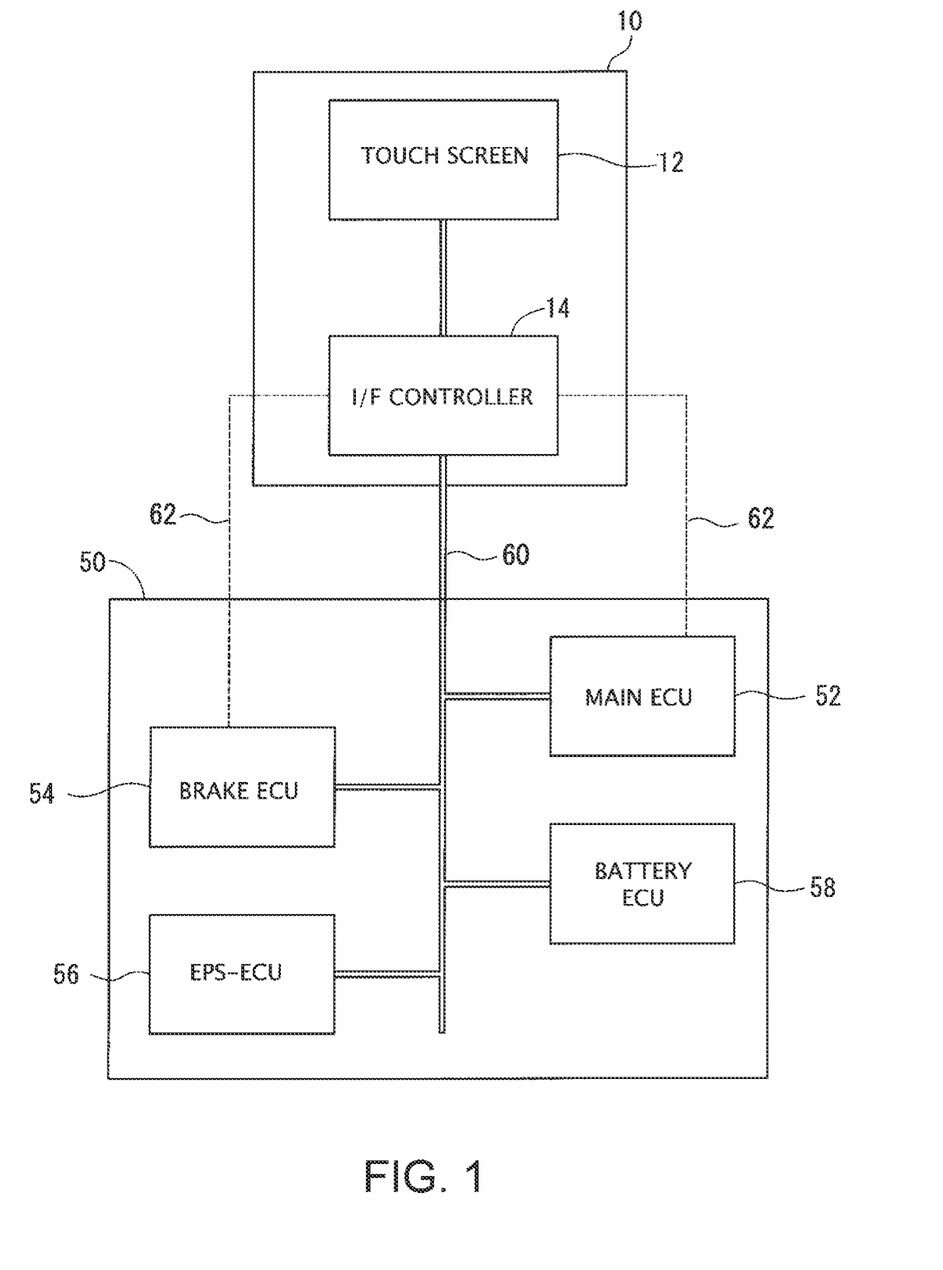
FIG. 1 is a block diagram illustrating the configurations of an interface apparatus and a vehicle controller.
Figure 2:
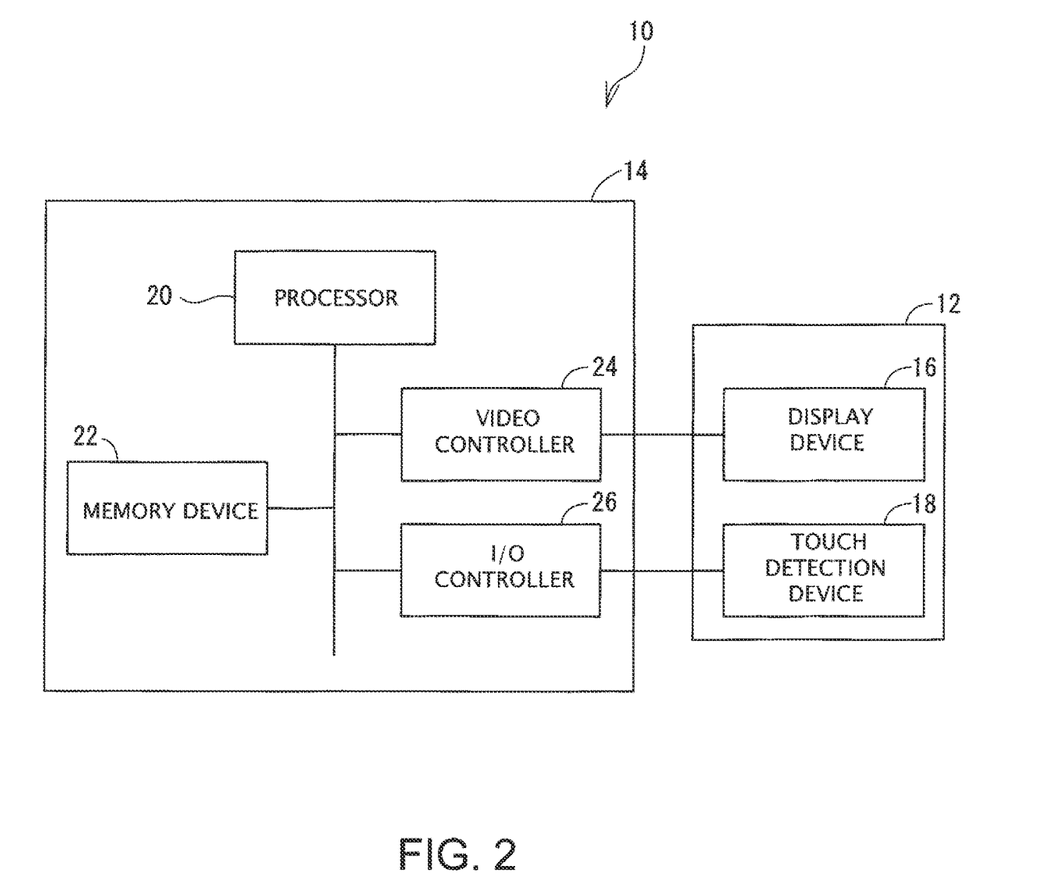
FIG. 2 is a block diagram illustrating the specific configuration of the interface apparatus.

The configuration of an interface apparatus 10 will be described by reference to the drawings. FIG. 1 is a block diagram illustrating the configurations of the interface apparatus 10 and a vehicle controller 50. FIG. 2 is a block diagram illustrating the specific configuration of the interface apparatus 10. The interface apparatus 10 is mounted in a vehicle to provide various information to an operator and receive from the operator instructions for traveling of the vehicle. The operator used herein refers to a person on board of the vehicle to input instructions for traveling of the vehicle; that is, a driver.

The interface apparatus 10 is mounted in a vehicle having switchable modes: fully automated driving, partially automated driving, and manual driving. In the fully automated driving mode, the vehicle travels automatically according to instructions from an operation center outside of the vehicle. In the partially automated driving mode, the vehicle drives autonomously based on results of detection performed by a sensor disposed in the vehicle without communication with the center. In the manual driving mode, the operator executes all of driving tasks. In this embodiment, the vehicle travels mainly in the fully automated driving mode or the partially automated driving mode, with the manual driving mode being selected only exceptionally. The vehicle in this example therefore includes no mechanical input devices mounted in conventional manual driving vehicles, such as a steering wheel and an acceleration pedal. Many of the instructions regarding traveling of the vehicle are input through the interface apparatus 10. It should be noted that the vehicle of this type is only an example; the interface apparatus 10 may be mounted in other types of vehicles.

As illustrated in FIG. 1, the interface apparatus 10 includes a touch screen 12, and an I/F controller 14 that controls display of the touch screen 12 and outputs to the vehicle controller 50 a signal in response to the operator's touch. As illustrated in FIG. 2, the touch screen 12 includes a display device 16 that displays various information, and a touch detection device 18 that detects the operator's touch.

The display device 16 displays various images in response to instructions from the I/F controller 14. The display device 16 may be a liquid crystal display or an organic EL display, for example. The touch detection device 18 is formed from a transparent material and is disposed on a front face of the display device 16 to detect coordinates of a location on a screen touched by the operator. The touch detection may be electrostatic detection for detecting a change in capacitance caused by a touch input, or pressure-sensitive detection for detecting a weak pressure generated in response to touch input. In either case, the touch screen 12 outputs to the I/F controller 14 the coordinates corresponding to a location touched by the operator.

The I/F controller 14 controls display of the touch screen 12 and outputs to the vehicle controller 50 a signal in accordance with the operator's touch. As illustrated in FIG. 2, the I/F controller 14 is a computer having a processor 20, a memory device 22, a video controller 24, and an I/O controller 26. The "computer" used herein includes a micro controller including a computer system assembled in a single integrated circuit. The processor 20 refers to a processor in a broad sense, and includes a general-purpose processor (such as a Central Processing Unit (CPU)) and a specific-purpose processor (such as a Graphics Processing Unit (GPU), Application Specific Integrated Circuit (ASIC), Field Programmable Gate Array (FPGA), or programmable logic device). The memory device 22 may include at least one of a semiconductor memory (such as RAM, ROM, or solid-state drive) or a magnetic disk (such as a hard disk drive).

The video controller 24 controls display of the display device 16 under the control of the processor 20. The I/O controller 26 controls data transfer with other devices mounted in the vehicle, which are specifically the touch detection device 18 and the vehicle controller 50. While FIGS. 1 and 2 illustrate the I/F controller 14 as a single computer, the I/F controller 14 may be composed of a plurality of physically separate computers. The I/F controller 14 may therefore include a plurality of processors 20.

The I/F controller 14 and the vehicle controller 50 are connected with each other for transfer of various data via a first communication line 60. The first communication line 60 is a communication line for serial communication for transmitting and receiving a plurality of types of signals, and may be a communication line for data transfer with Controller Area Network (CAN) communication protocol, for example. The I/F controller 14 is further connected with some ECUs via a second communication line 62 that is a sub communication line prepared for a case where communication with the first communication line 60 should be interrupted.

The vehicle controller 50 includes ECUs 52, 54, 56, and 58, as illustrated in FIG. 1. The configurations of these ECUs may be modified as appropriate. In the example illustrated in FIG. 1, the vehicle controller 50 includes a main ECU 52 that is directly communicable with the I/F controller 14. The main ECU 52 is communicable with a brake ECU 54, an electrically driven power steering ECU (EPS-ECU) 56, and a battery ECU 58, for example. Some of the ECUs can receive specific signals via the second communication line 62 even when communication via the first communication line 60 is not performed. When the first communication line 60 is interrupted, for example, in response to input of emergency stop operation via the touch screen 12, a signal instructing emergency stop is input, via the second communication line 62, to some ECU, such as the brake ECU 54. An operation screen displayed on the touch screen 12 will be now described.

Figure 3:
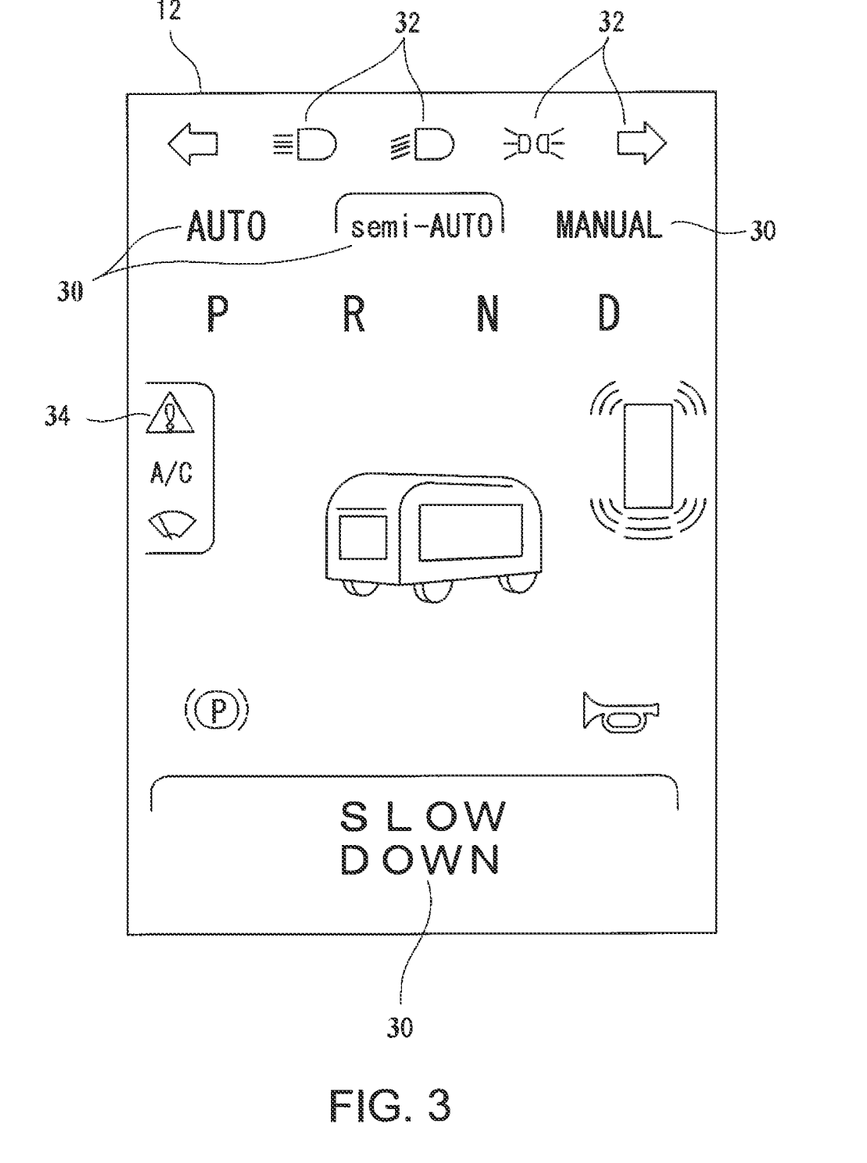
FIG. 3 illustrates an example operation screen.

FIG. 3 illustrates an example operation screen. The I/F controller 14 causes the touch screen 12 to display a plurality of operation switches, as illustrated in FIG. 3. These operation switches are displayed irrespective of occurrence of events which will be described below.

The switches include switches 30 regarding traveling. The switches 30 include an "AUTO" switch for selecting the fully automated driving mode, a "semi-AUTO" switch for selecting the partially automated driving mode, a "MANUAL" switch for selecting the manual driving mode, and a "SLOW DOWN" switch for instructing deceleration, for example. The switches also include switches 32 regarding lighting, including, for example, a switch for instructing operation of a direction indicating light, and a switch for instructing the lighting direction of the head light, for example. The switches further include a message display switch 34 for instructing display of a message list, which will be descried below. The message display switch 34 will be described in detail below.

The touch detection device 18, detecting an operator's touch, outputs to the I/F controller 14 coordinates corresponding to the touched location. The I/F controller 14 specifies a switch corresponding to the coordinates, and outputs to the vehicle controller 50 a control signal associated with the specified switch, as required. In response to detection of touch to a display region of the "SLOW DOWN" switch, for example, the I/F controller 14 outputs to the vehicle controller 50 a control signal that instructs deceleration. The vehicle controller 50, based on the control signal, controls traveling of the vehicle for deceleration.

The I/F controller 14, in response to occurrence of an event, displays a message corresponding to the event on the touch screen 12. Here, an event refers to a phenomenon concerning which information needs to be reported to the operator or for which an instruction from the operator is to be obtained. Such an event includes a change of a vehicle to a predetermined state, such as a case where the vehicle stops according to an instruction from the operation center and a case where the vehicle becomes shiftable to fully automated driving. The event further includes occurrence of an error, such as a communication error with the operation center or a communication error in in-vehicle LAN. The event further includes a case where an operator's instruction is required, such as in a case where during driving in the partially automated driving mode, an inquiry for whether or not passing of other vehicle is necessary is required.

These events and corresponding messages are stored in the memory device 22 of the I/F controller 14 in association with each other. The I/F controller 14, in response to occurrence of an event, refers to the information stored in the memory device 22 and displays the corresponding message on the touch screen 12.

The memory device 22 stores a plurality of types of messages having different urgency levels in accordance with the types. For example, a message, such as "stop in accordance with the center's instruction", that notifies a state of the vehicle is a non-urgent message, and would not cause a serious problem even when the operator misses the message. However, in case of occurrence of some serious errors, it is necessary to display a message that instructs the operator to operate the emergency stop switch. Such a message is an urgent message, and needs to be viewed by the operator without fail. In this embodiment, messages of different types are classified into at least two groups according to their urgency levels for managing, and displayed in different modes in accordance with the urgency levels.

Figure 4:
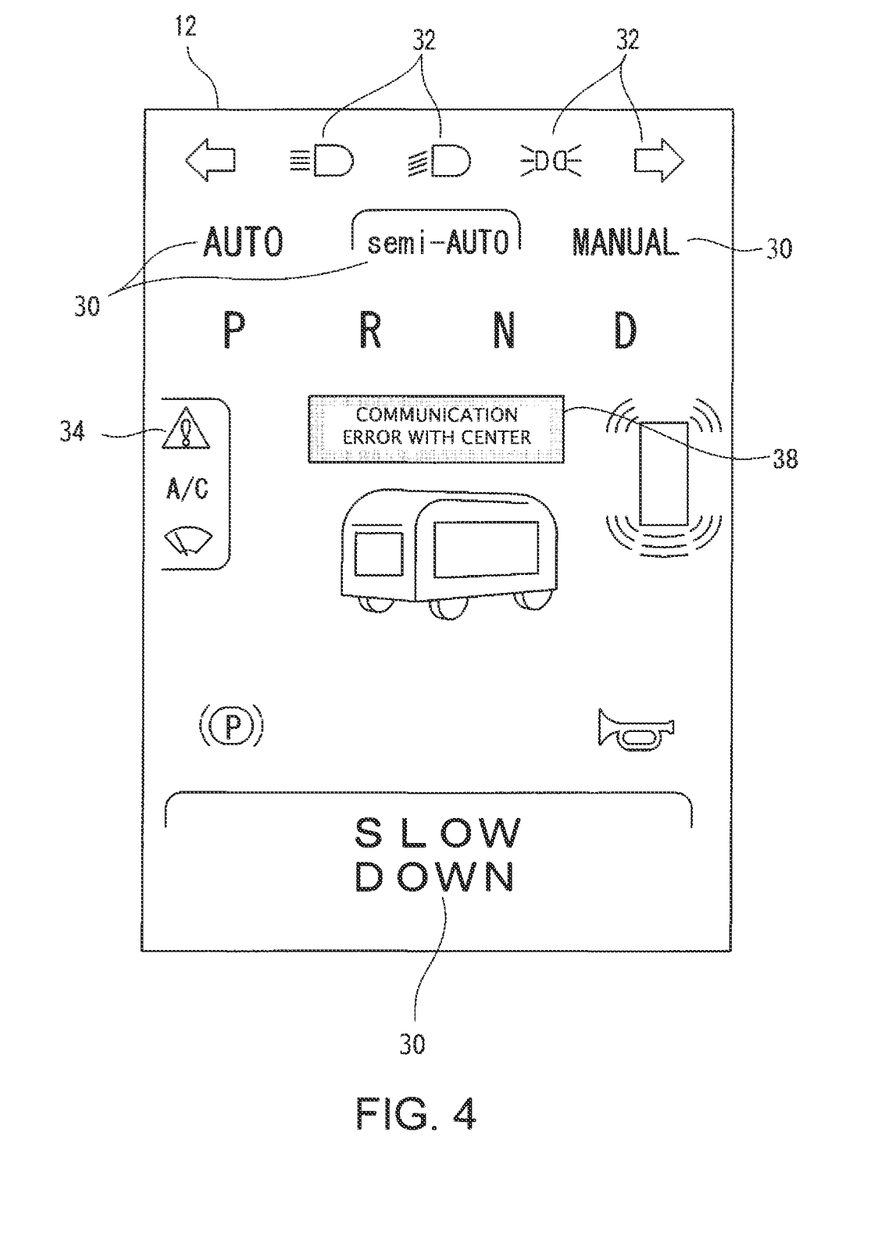
FIG. 4 illustrates a display example of a second message.
Figure 5:
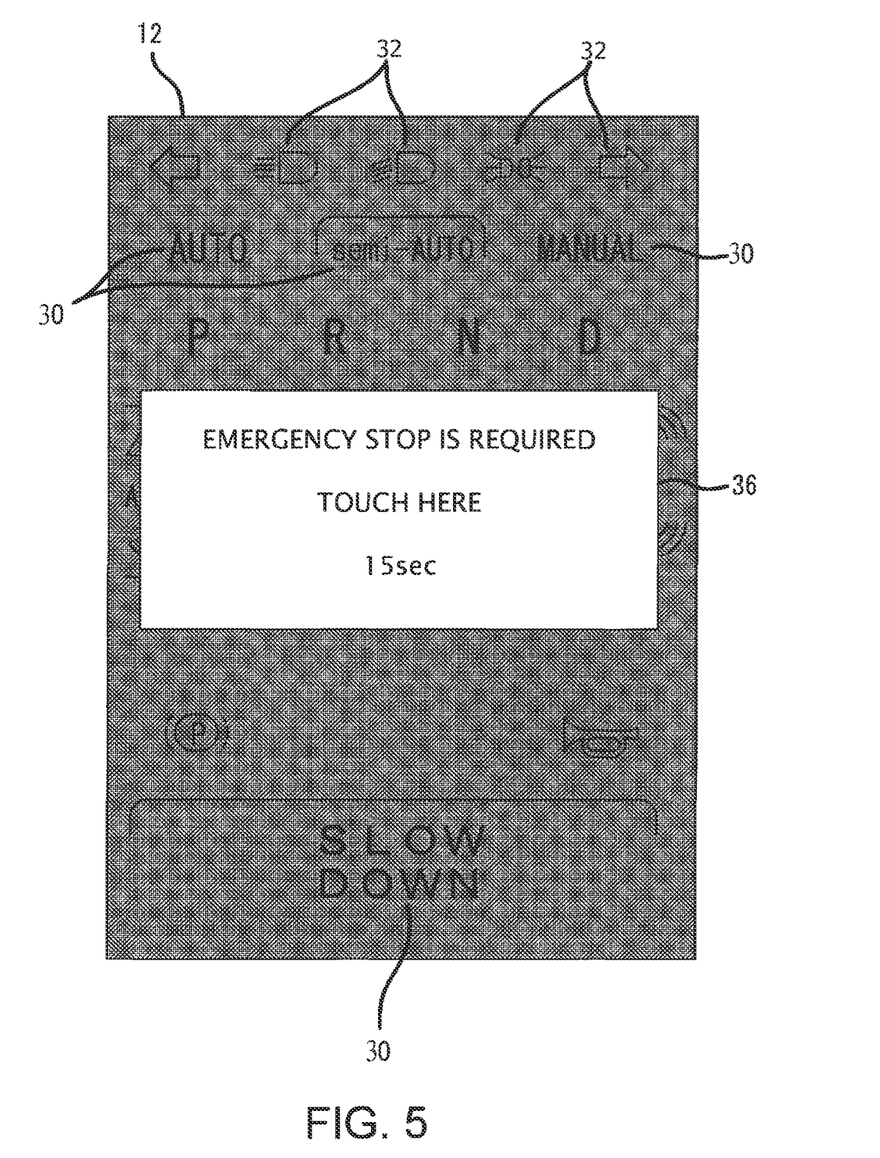
FIG. 5 illustrates a display example of a first message.

Specifically, the memory device 22 of the I/F controller 14 stores a first message 36 with a first urgency level and a second message 38 with a second urgency level that is lower than the first urgency level, in association with corresponding events. FIG. 4 illustrates example display of the second message 38 and FIG. 5 illustrates example display of the first message 36.

The second message 38 is a non-urgent message, for which the operator's miss is permitted. The second message 38 may include, for example, a message that notifies occurrence of a communication error with the operation center. As illustrated in FIG. 4, the second message 38 is displayed at a location and in a size that do not cover the switches 30 for traveling and the switches 32 for lighting. Such location and size of the second message 38 enable operations concerning safety of the vehicle during display of the second message 38.

The second message 38 only indicates a corresponding event, and the display region of the second message 38 does not function as a switch. Therefore, touch to the display region of the second message 38 would not trigger any operations. After elapse of a predetermined timeout period from the start of display, the second message 38 automatically disappears. The second message 38 is displayed in a color pattern which would not make the operator sense an emergency, such as a color pattern with green background, for example.

Figure 6:
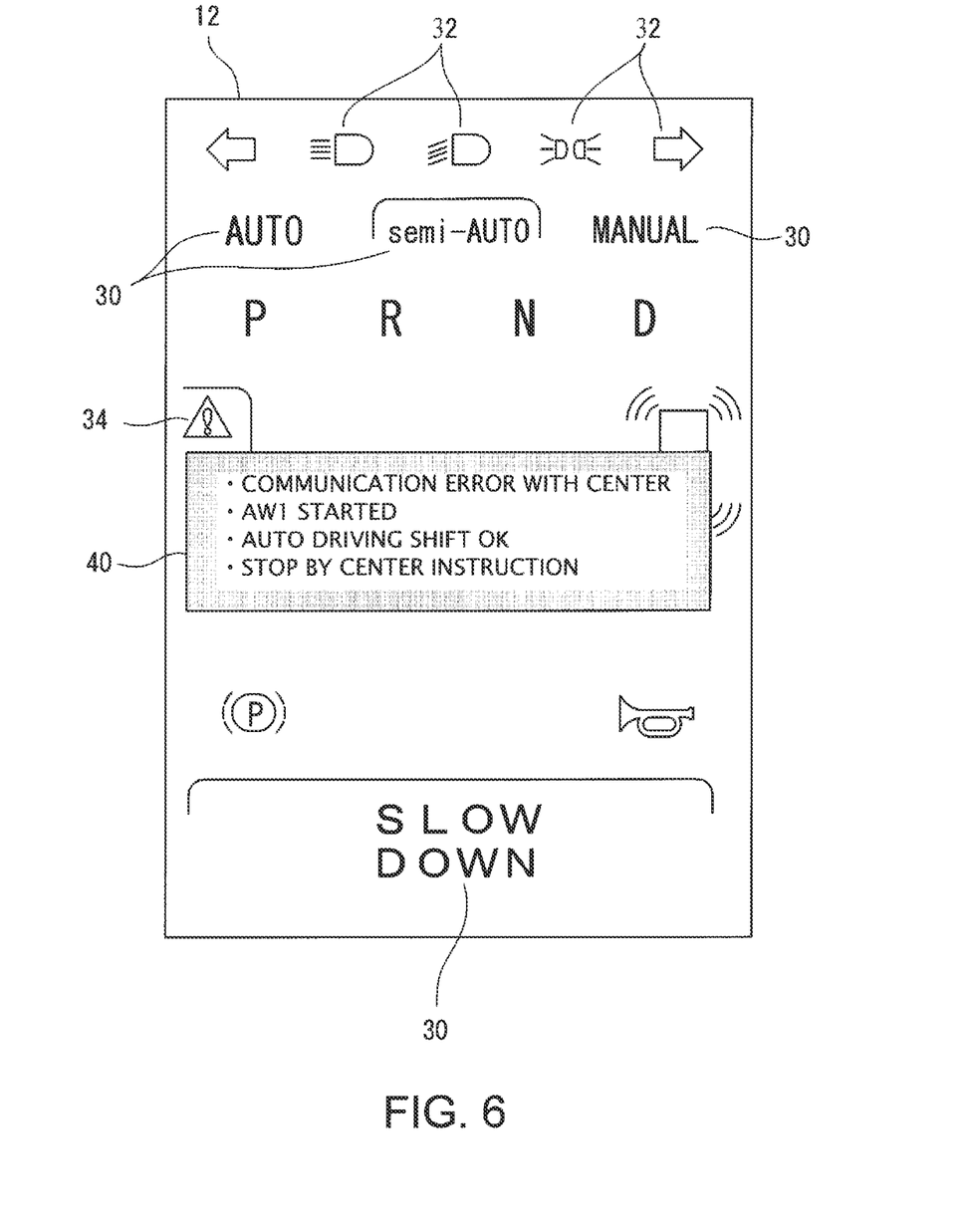
FIG. 6 illustrates a display example of a message list.

The I/F controller 14 stores as a log the second message 38 which has been displayed. In response to detection of touch to the display region of the message display switch 34, the I/F controller 14 displays a list 40 of the second messages 38 stored as logs, as illustrated in FIG. 6. The number of second messages 38 displayed in the list 40 is not limited. The displayed messages may include all of the second messages 38 that have been displayed from a predetermined time in the past to the present time, or only a predetermined number of the second messages 38. In either case, the operation of the message display switch 34 to display the list 40 of the second messages 38 that have been displayed enables the operator to confirm even the missed second message 38 later. The displayed message list 40 may be closed by touching the message display switch 34 once again.

The first message 36 is an urgent message, which requires the operator's attention immediately and without fail. The first message 36 includes, for example, a message that notifies that emergency stop of the vehicle is required due to occurrence of an emergency event. The first message 36 is associated with predetermined driving control. For example, a message that notifies that emergency stop of the vehicle is required is associated with driving control "vehicle emergency stop". The I/F controller 14, in response to detection of touch to the display region of the first message 36, outputs to the vehicle controller 50 a signal that instructs execution of the associated driving control. As such, the first message 36 notifies information and also functions as an operation switch that instructs execution of the associated driving control.

When the communication between the I/F controller 14 and the vehicle controller 50 through the first communication line 60 is lost, for example, various instructions from the operator cannot reach the vehicle controller 50 and safe traveling may be hindered.

Under such a circumstance, the I/F controller 14 displays on the touch screen 12 the first message 36 that notifies that emergency stop is required. In this case, the first message 36 itself functions as an emergency stop switch. Specifically, upon occurrence of an event of communication interruption through the first communication line 60, the touch screen shows a message "Emergency stop is required: Touch here", as the first message 36, as illustrated in FIG. 5. In response to detection of touch to the display region of the first message 36, the I/F controller 14 outputs an emergency stop signal, through the second communication line 62, to the vehicle controller 50. This configuration that allows the first message 36 itself to function as a switch eliminates the need to dispose an additional switch, to thereby allow the operator to issue necessary operation instructions immediately. This configuration that allows the message itself to function as a switch further requires a smaller space than a space in which the message and the switch are separately displayed, thereby reducing a size of the touch screen 12.

In response to absence of detection of a touch to the first message 36 until a predetermined timeout period has elapsed from the start of display of the first message 36, the I/F controller 14 terminates the display of the first message 36 and outputs to the vehicle controller 50 a signal that instructs execution of driving control corresponding to the first message 36. In the example illustrated in FIG. 5, in response to absence of detection of touch to the first message 36 until elapse of the timeout period, the I/F controller 14 outputs to the vehicle controller 50 a signal that instructs emergency stop through the second communication line 62. Execution of the predetermined driving control even without the operator's touch as described above ensures reliably ensures necessary driving control. Here, the first message 36 may include an image for counting time to the timeout. The timeout period for the first message 36 may be shorter than the timeout period for the second message 38. Such a short timeout period for the first message 36 enables immediate execution of emergency stop. Conversely, the timeout period for the second message 38 may be shorter than the timeout period for the first message 36. Such short-time display of the second message 38 prevents a complicated screen.

As described above, before the elapse of the timeout period, the operator's touch to the display region of the first message 36 enables execution of corresponding driving control at a desired timing, which further results in execution of the corresponding driving control at a proper timing. In case of emergency stop, for example, the stop position of a vehicle must be away from an intersection. In this embodiment, touching the first message 36 at a timing when the vehicle is away from an intersection after the first message 36 is displayed enables the vehicle to stop in emergency at an appropriate timing. Meanwhile, should the operator miss the first message 36 or should a response to the first message 36 be delayed, the corresponding driving control is executed automatically after elapse of the timeout period such that execution of necessary driving control is ensured.

Here, during display of the first message 36, the I/F controller 14 displays regions other the region of the first message 36 in grayed out as illustrated in FIG. 5 and makes touch to the operation switches other than the first message 36 inoperable. Thus, during display of the first message 36, touch to the switches 30 regarding traveling and the switches 32 regarding light is inoperable. This configuration enables the operator to notice the first message 36 more reliably, thereby efficiently preventing miss of the first message 36. Rendering all other operation switches inoperable further prevents misoperation of unnecessary switches and enables more reliable operation of the necessary switch.

Figure 7:
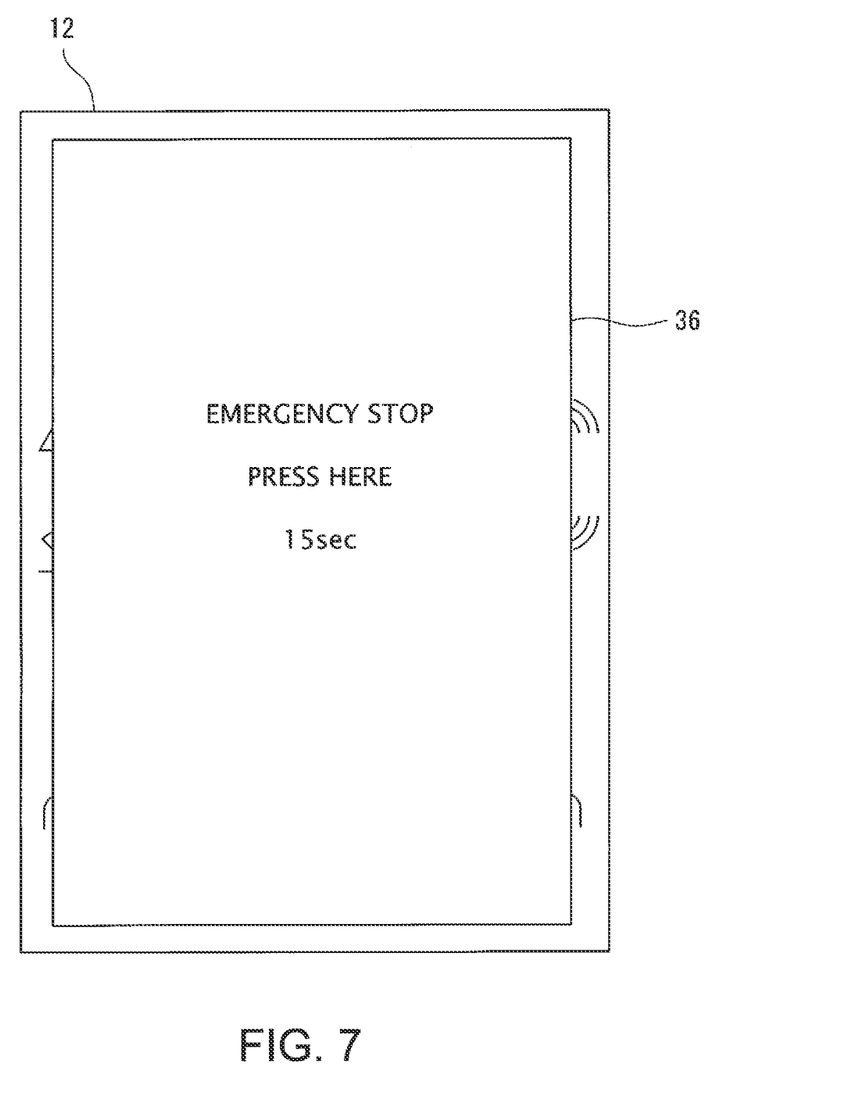
FIG. 7 illustrates another display example of the first message.

While in this embodiment, the regions other than the display region of the first message 36 are grayed out, other display modes that allow the operator to recognize the operation switches other than the first message 36 being inoperable may be employed. For example, the first message 36 may be displayed at a location and in a size that cover all other operation switches, as illustrated in FIG. 7. This configuration physically prevents the operator from touching other operation switches to thereby allow the operator to recognize the other operation switches being inoperable. The first message 36 may be displayed in a color pattern that is different from that of the second message 38. For example, the first message 36 may be displayed with a background having a red color that is suggestive of emergency.

Figure 8:
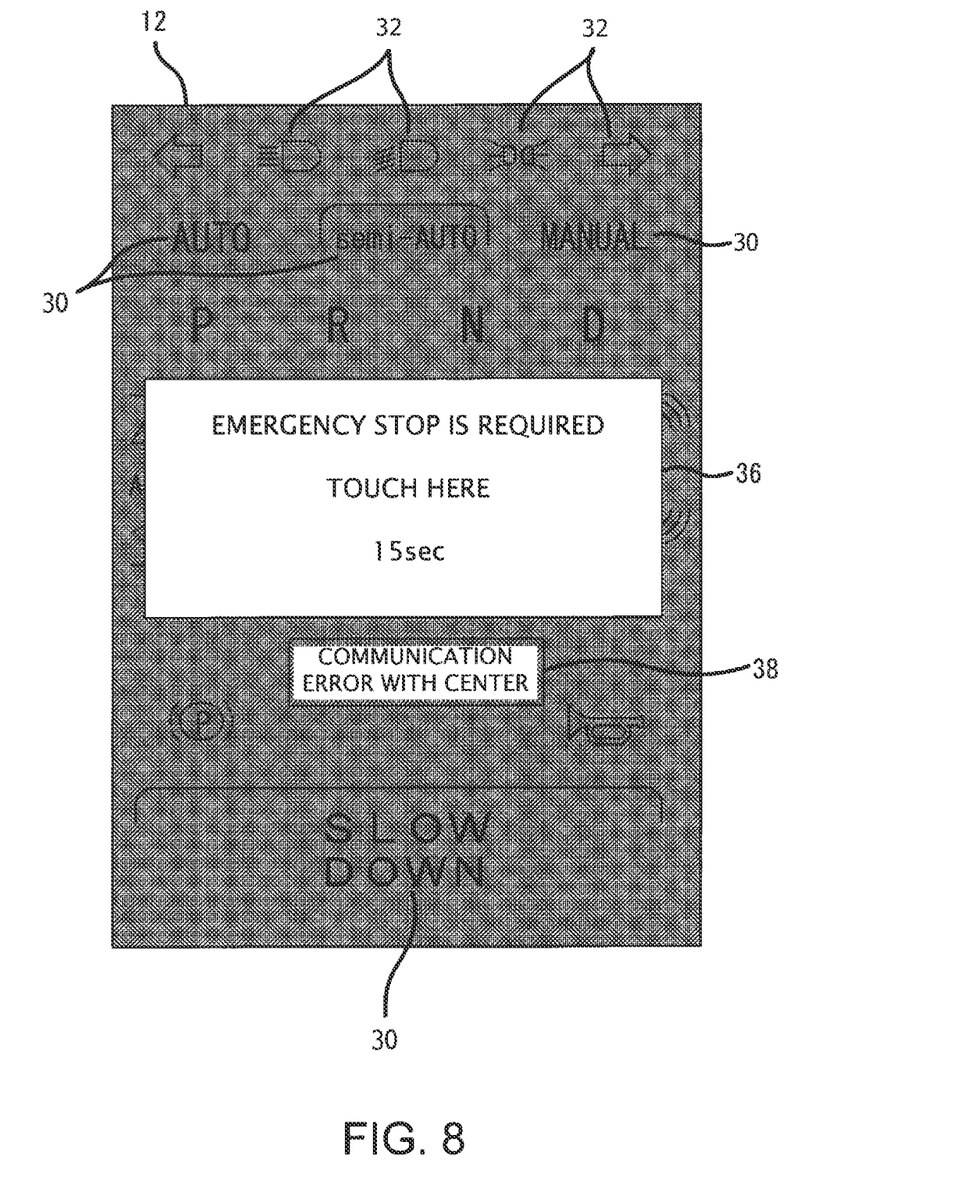
FIG. 8 illustrates simultaneous display of the first message and the second message.

Here, an event corresponding to the first message 36 and an event corresponding to the second message 38 may occur at substantially the same time, so that the first message 36 may be displayed while the second message 38 is displayed. In such a case, the I/F controller 14 displays the first message 36 further frontward with respect to the second message 38 in a superposed manner. Therefore, if the display region of the second message 38 overlaps the display region of the first message 36, a portion of the second message 38 overlapping the first message 36 is invisible. Even if the display region of the second message 38 does not overlap the display region of the first message 36, the second message 38 is grayed out as with the other operation switches, as illustrated in FIG. 8. This configuration makes the first message 36 more noticeable, allowing the operator to notice the presence of the first message 36 more reliably.

As clearly described above, in this embodiment, the first message 36 is displayed in a noticeable manner and the first message 36 itself functions as a switch to instruct execution of the driving control corresponding to the first message 36. This configuration eliminates the need to dispose a switch separately for instructing execution of necessary driving control to thereby reduce the size of the touch screen, and also allows the operator to immediately respond to occurrence of an urgent message. The configuration described above is only an example, and any other modified configurations may also be employed in which the first message 36 and the second message 38 with an urgency level lower than that of the first message 36 are stored in association with corresponding events, a corresponding message is displayed on the touch screen 12 at the time of occurrence of an event, and, in response to detection of touch to the display region of the first message 36 during display of the first message 36, driving control corresponding to the first message 36 is executed.

The content of the message and the location and size of the message may be modified as appropriate. Further, while in this embodiment, all other operation switches are rendered inoperable while the first message 36 is displayed, all or some of the other operation switches may be maintained operable in a manner that prevents misoperations. In addition, while in this embodiment, in response to elapse of the timeout period from the start of display of the first message 36, the corresponding driving control is automatically executed, there may be employed a configuration that inhibits execution of the corresponding driving control unless touch to the first message 36 is detected.

REFERENCE SIGNS LIST 10 interface apparatus, 12 touch screen, 14 I/F controller, 16 display device, 18 touch detection device, 20 processor, 22 memory device, 24 video controller, 26 I/0 controller, 30 switch regarding traveling, 32 switch regarding light, 34 message display switch, 36 first message, 38 second message, 40 message list, 50 vehicle controller, 52 main ECU, 54 brake ECU, 56 EPS-ECU, 58 battery ECU, 60 first communication line, 62 second communication line.

The invention claimed is:

1. An on-vehicle interface apparatus, comprising:
a touch screen configured to display an image and detect touch to a screen by an operator; and
a first controller configured to control display of the touch screen and output to a vehicle controller a signal corresponding to the touch by the operator, the first controller storing a first message with a first urgency level, the first message corresponding to predetermined driving control, and a second message with a second urgency level lower than the first urgency level and not corresponding to driving control, in association with respective events,
the first controller further being configured to:
display a plurality of operation switches including operation switches regarding traveling of a vehicle irrespective of the events on the touch screen, and, in response to occurrence of any of the events, display a corresponding message on the touch screen,
in response to detection of a touch operation on a display region of the first message during display of the first message, output to the vehicle controller a signal that instructs execution of the driving control corresponding to the first message, and
in response to detection of a touch operation on a display region of the second message during display of the second message, not output a signal to the vehicle controller, and in response to detection of a touch operation on the plurality of operation switches during display of the second message, output to the vehicle controller a control signal corresponding to the touched operation switch.

2. The on-vehicle interface apparatus according to claim 1, wherein
the first controller is configured to cover all of the plurality of operation switches during display of the first message and render inoperable touch to the plurality of operation switches.

3. The on-vehicle interface apparatus according to claim 1, wherein
the first controller is configured to output a signal that instructs execution of the driving control corresponding to the first message to the vehicle controller in response to absence of detection of touch to the display region of the first message until elapse of a predetermined timeout period from start of display of the first message.

4. The on-vehicle interface apparatus according to claim 1, wherein
the first controller is configured to display the second message at a location and in a size that do not cover the operation switches regarding traveling of the vehicle and an operation switch regarding lighting.

5. The on-vehicle interface apparatus according to claim 1, wherein
the first controller is configured to display the first message further frontward with respect to the second message in a superposed manner to display the first message during display of the second message.

6. The on-vehicle interface apparatus according to claim 1, wherein
the first controller is further configured to display, in response to occurrence of any of the events, the corresponding message on a window of the touch screen that displays the plurality of operation switches, without changing the window of the touch screen that displays the plurality of operation switches.

7. The on-vehicle interface apparatus according to claim 1, wherein the first controller is further configured to:
terminate display of the second message after a predetermined timeout period has elapsed from the start of display of the second message;
store the second message for which the display has terminated as a log; and
in response to an instruction from the operator, display a list of second messages which are stored as the log.

8. The on-vehicle interface apparatus according to claim 1, wherein:
the first controller is further configured to terminate display of the first message or the second message after a predetermined timeout time has elapsed from start of display of the first message or the second message; and
the timeout period for the first message is shorter than the timeout period for the second message.

9. The on-vehicle interface apparatus according to claim 1, wherein:
the first message is a message regarding emergency stop of the vehicle, and;
the first controller is configured to:
output a signal to the vehicle controller such that the vehicle stops in emergency at a timing of detection of a touch operation on a display region of the first message after display of the first message is started; and
in response to absence of detection of a touch operation on the display region of the first message until elapse of a predetermined timeout period from start of display of the first message, output a signal to the vehicle controller such that the vehicle stops in emergency at the timing of the elapse of the timeout period.

* * * * *